United States Patent
Valdez et al.

(10) Patent No.: US 8,537,687 B2
(45) Date of Patent: Sep. 17, 2013

(54) LEAST COST ROUTING

(75) Inventors: John Valdez, Flower Mound, TX (US);
Vivek Pachaiyappan, Little Elm, TX (US); Vamshi K. Gillipalli, Irving, TX (US); Amit B. Patadia, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 848 days.

(21) Appl. No.: 12/062,248

(22) Filed: Apr. 3, 2008

(65) Prior Publication Data

US 2009/0252039 A1  Oct. 8, 2009

(51) Int. Cl.
*H04L 12/24* (2006.01)

(52) U.S. Cl.
USPC ........................................ 370/238

(58) Field of Classification Search
USPC .................. 370/465, 466, 467, 238
See application file for complete search history.

(56) References Cited

U.S. PATENT DOCUMENTS

| | | | |
|---|---|---|---|
| 6,118,864 A * | 9/2000 | Chang et al. | 379/225 |
| 6,614,781 B1 * | 9/2003 | Elliott et al. | 370/352 |
| 7,831,034 B2 * | 11/2010 | Maximo et al. | 379/352 |
| 2002/0114439 A1 * | 8/2002 | Dunlap | 379/219 |
| 2003/0215072 A1 * | 11/2003 | Barker et al. | 379/114.01 |
| 2005/0041642 A1 * | 2/2005 | Robinson | 370/352 |
| 2007/0121590 A1 * | 5/2007 | Turner et al. | 370/352 |
| 2007/0217375 A1 * | 9/2007 | Zampiello et al. | 370/338 |

* cited by examiner

*Primary Examiner* — Mark Rinehart
*Assistant Examiner* — Mohammad Anwar

(57) ABSTRACT

A system includes a communications device configured to selectively allow communications in a plurality of communications protocols, and a router configured to receive a communications request from a user. The router may determine a preferred communications protocol from the plurality of communications protocols, based on at least a portion of the received communications request.

22 Claims, 6 Drawing Sheets

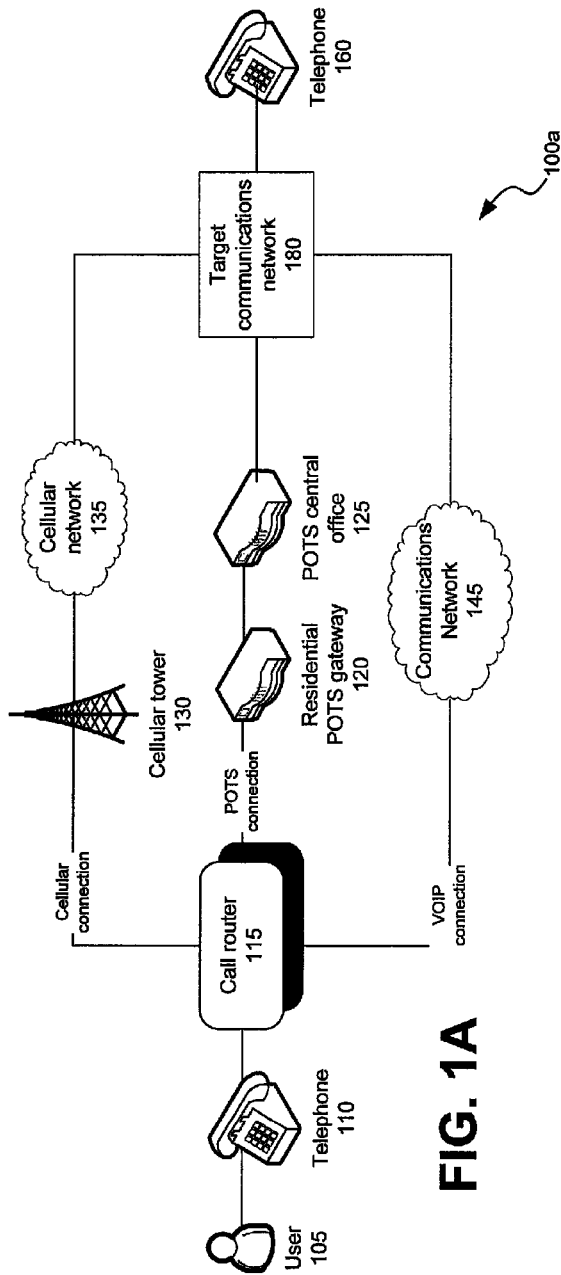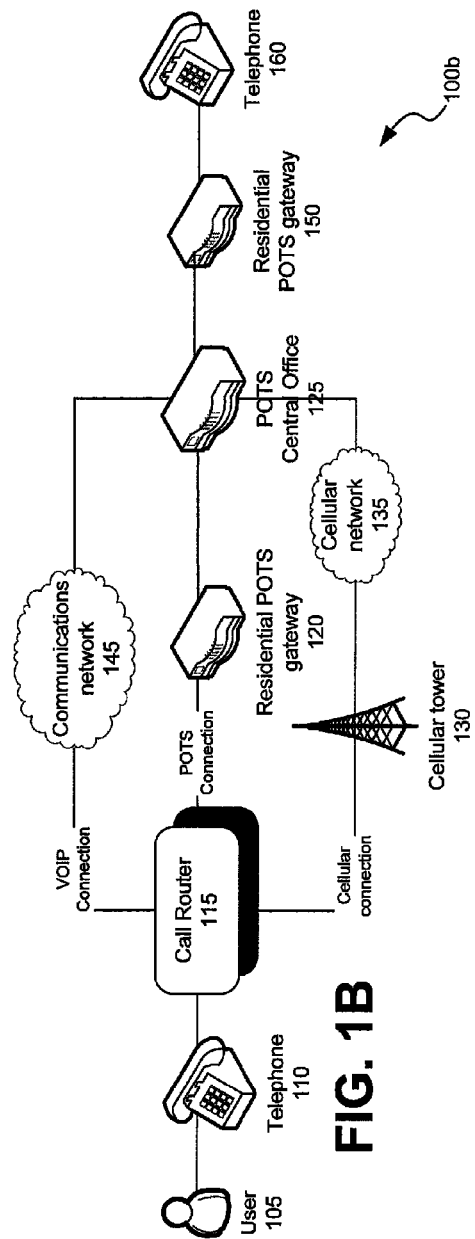
FIG. 1A
FIG. 1B

| Local Area Codes | Toll Free Area Codes |
|---|---|
| 248 | 800 |
| 313 | 855 |
| 517 | 866 |
| 734 | 877 |
| 810 | 888 |
| 310 | 320 |

LEAST COST ROUTING

BACKGROUND

Home telephone users have an increasing number of communications options for initiating telephone calls. For instance, in addition to traditional Plain Old Telephone Service (POTS) systems that have been ubiquitous in homes for decades, additional communications options include cellular phones, satellite phones and, more recently, telephone calls using Voice Over Internet Protocol (VOIP). It is not uncommon for a user to have multiple communications protocols available to them, each having strengths and weaknesses. For instance, a user may have a POTS telephone connection as well as a VOIP connection. POTS is a robust system, which can make calls to virtually any phone number. It has a well-established emergency system (911) that has proven reliability. With the payment of a monthly fee, POTS services usually include free "local" calling, free emergency calling, and free "toll-free" calling. Long-distance calling is generally available at an increased price, which can vary based on several factors, including the distance between the user and the destination, phone companies serving particular areas, whether the call is national or international, etc. Accordingly, certain aspects of POTS systems may be confusing and expensive.

VOIP systems generally include a communications device configured to communicate over an Internet connection. With the payment of a monthly fee, VOIP systems generally include unlimited local and national long distance calling. International calling is generally available as well, as part of a service package, or at a significantly lower rate than POTS systems. While generally cost effective, VOIP systems are generally not well suited to emergency calls, particularly when compared to POTS systems. As VOIP systems are generally tied to a particular Internet protocol (IP) address, which may be moved from one location to another, it may be difficult for an emergency operator to precisely locate a caller during an emergency. Additionally, VOIP is susceptible to power outages, and to network outages.

Accordingly, each of the various communications protocols available to a user has both strengths and weaknesses.

BRIEF DESCRIPTION OF THE DRAWINGS

FIG. 1A illustrates an exemplary system for communications routing;

FIG. 1B illustrates an exemplary system for communications routing;

FIG. 3 illustrates an exemplary data file;

DETAILED DESCRIPTION OF PREFERRED EMBODIMENTS

Figure 1C:
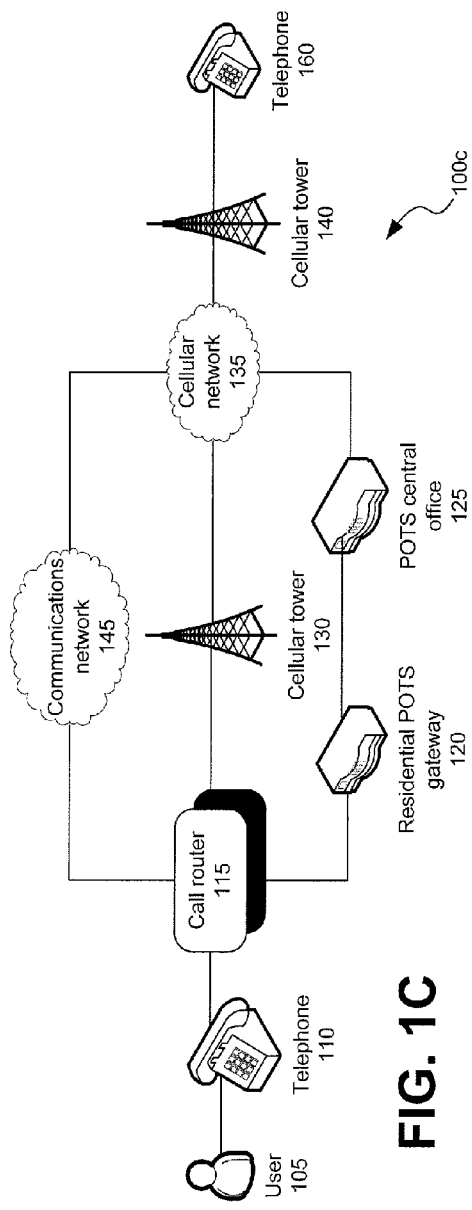
FIG. 1C illustrates an exemplary system for communications routing.

When a user has access to multiple communications protocols, such as when a user has a Plain Old Telephone Service (POTS) telephone, a Voice Over Internet Protocol (VOIP) connection and a cellular connection, one of the options may be better than the others in certain situations. For example, cost considerations (e.g., minimizing system cost), network considerations (e.g., maximizing network efficiency), safety considerations, etc., may make a particular protocol a preferred option in a given circumstance. Cost considerations, such as minimizing system cost, may include, for example, minimizing cost to a user, minimizing cost to a service provider, etc. Network considerations, such as maximizing network efficiency, may include, for example, whether a network is functioning properly, the current load on a network, available bandwidth on a network, network reliability, etc. By way of example, and not of limitation, a cellular or VOIP connection may be a better choice than POTS for a long distance call as long distance is generally included in cellular and VOIP service plans. Long distance calls generally incur an extra cost in POTS systems. An emergency call, on the other hand, may be better suited to a POTS connection. Emergency calls are generally free calls, and the importance is on a robust system and the ability for operators to geographically locate the party calling. POTS is a reliable, robust system through which a location may be determined once a connection is established, and is less susceptible to factors such as power outages and network outages and latency, as well as other factors.

Network and system considerations, such as maximizing network efficiency, may also play a role in whether one communications protocol is preferred over another in a particular circumstance. For instance, as cellular traffic may be at a peak at certain times, such as during rush hours, POTS may be a preferable choice for a particular call made during those times, to help balance network demands. Further, if one network or communications protocol is experiencing a problem or an outage, such as if an Internet hub is down, the power is out, or cellular signals are weak, another connection protocol may be preferred for a particular call made during that time.

While the user may have multiple communications protocols available, it may be difficult for a user to decide which method to use for a particular communication. Accordingly, the following system includes a telephone capable of communicating using any of the communications protocols, and a router configured to choose a preferred communications protocol for a particular communication. The router may be included as a standalone hardware device, or may be included as software running, for example, on internal memory within the communications device.

As used herein, "telephone" may include a traditional telephone, an Internet telephone, a cellular phone, or other communications device configured to transmit voice communications.

FIGS. 1A-1D illustrate exemplary systems 100a, 100b, 100c, 100d configured to receive a communications request, and to allow a communication over a preferred communications protocol. A telephone 110 may be configured to receive a user input, such as a telephone number, through one or more input devices, such as digit buttons, a touch screen, etc. Telephone 110, which may be located, for example, in a home, a business, etc., may be configured to communicate with a destination telephone 160 in one of at least two ways. In FIG. 1A, system 100a illustrates a general exemplary approach by which telephone 110 may communicate with destination telephone 160. In this exemplary approach, telephone 110 may communicate over any of a POTS connection, a cellular connection and a VOIP connection. If telephone 110 communicates using a POTS connection, POTS central office 125 will generally receive a communications request from telephone 110 through a residential POTS gateway 120. Upon receiving the communications request from telephone 110, POTS central office 125 may transmit the request to the appropriate target communications network 180. The target communications network 180 may be, by way of example and not of limitation, a cellular network, a POTS network, a VOIP network, or other network as is known. The target communications network may then transfer the received communication to the target communications network 180. Similarly, if telephone 110 communicates using a cellular connection, a cellular network 135 may generally receive a communications request from telephone 110 over a local cellular tower 130. Upon receiving the communications request from telephone 110, cellular network 135 may transmit the request to the appropriate target communications network 180. Alternatively, if telephone 110 communicates using a VOIP connection, a communications network 145, which may be a packet switched network, such as the internet, may receive the communications request. Upon receiving the communications request from telephone 110, communications network 145 may transmit the request to the appropriate target communications network 180. Upon receiving a communications request, target communications network 180 may transmit the request to destination telephone 160.

Figure 1D:
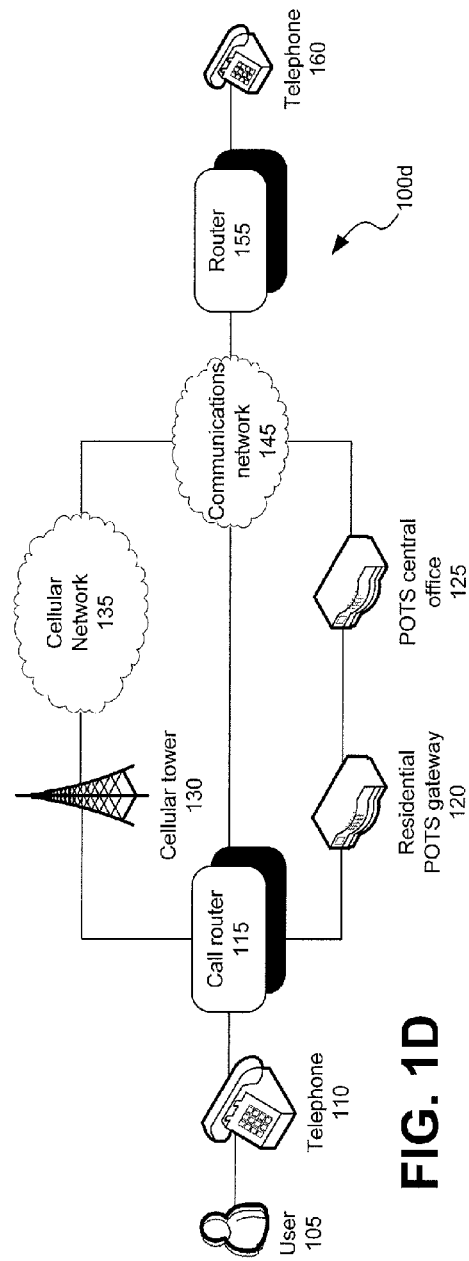
FIG. 1D illustrates an exemplary system for communications routing.

FIGS. 1B-1D illustrate exemplary embodiments wherein the target communications network 180 is a POTS network (FIG. 1B), a cellular network (FIG. 1C) and a VOIP network (FIG. 1D). In the exemplary approaches of FIGS. 1B-1D, telephone 110 may communicate with destination telephone 160 over a POTS connection, a cellular connection, or a VOIP connection. Destination telephone 160 is configured to communicate over a target communications network 180 (FIG. 1A). Referring to FIG. 1B, in system 100b the target network is a POTS network. POTS central office 125 is configured to receive a communication from telephone 110 over a POTS connection, a cellular connection or a VOIP connection, and to transmit communications to destination telephone 160, such as over a residential POTS gateway 150.

Referring now to FIG. 1C, in system 100c the target network is a cellular network 135. Cellular network 135 is configured to receive a communication from telephone 110 over a POTS connection, a cellular connection, or a VOIP connection, and to transmit communications to destination telephone 160, such as over cellular tower 140.

Referring to FIG. 1D, in system 100d the target network is a VOIP network. Communications network 145, which may be a packet switched network, such as the internet, is configured to receive communications from telephone 110 over a POTS connection, a cellular connection, or a VOIP connection, and to transmit communications to destination telephone 160, such as through a router 155.

Depending on the nature and/or the relationship of telephone 110 and destination telephone 160, one of the communications protocols may be preferable over the other. For instance, if the two telephones 110 and 160 are located within the same city, user cost considerations between POTS, cellular and VOIP may be irrelevant as local calling is generally included in all service plans. However, POTS may be a preferred communications method over cellular and VOIP based on service provider cost considerations, such as if a POTS connection is less expensive for a provider to maintain, or network efficiency considerations, such as network loads, bandwidth considerations, etc. On the other hand, if the two telephones 110 and 160 are far apart, a call between them may be a long distance call. VOIP may then be a preferred communications method over POTS, based on cost considerations such as minimizing cost to a user 105 or to a service provider. VOIP may be preferred over cellular, for instance, based on cost considerations such as network charges incurred by a service provider, or based on network considerations such as cellular signal strength, the amount of traffic on local cellular tower 130, etc. Various other aspects related to the source telephone 110 and the destination telephone 160 may determine whether one communications method is preferable to another in a given situation.

Telephone 110 may be in communication with a router 115. Router 115 may be included as a stand-alone device, or may be included as software running, for example, in a memory on telephone 110. Router 115 may be configured to receive user input, such as a phone number, from telephone 110. Telephone 110 may transmit user inputs as they are received, in real time or near real time, or may transmit an entire user input string including a plurality of individual user inputs. For instance, telephone 110 may transmit digits of a phone number individually, as they are input by user 105, or may buffer all digits and transmit an entire phone number to router 115 once it has been fully entered.

Router 115 may use the received user inputs to determine a preferred communications protocol for a communication. In one exemplary approach, router 115 may determine a preferred communications protocol by comparing at least a portion of the received user input (e.g., received digits) to data within a data store, such as a data file or database, accessible to router 115. In one exemplary approach, router 115 may determine a preferred communications protocol by first determining a "call type" associated with the communications request, and subsequently referencing a data store, such as a database, to determine a communications method associated with the request. Call types may include, by way of example and not of limitation, local calls, long distance calls, emergency calls and operator calls. Long distance calls may be further broken down into national long distance calls and international long distance calls. In the exemplary approach, when the router 115 has determined a call type corresponding to the communications request, router 115 may reference a database, such as protocol settings table 420 (FIG. 4) indicating preferred protocols for each call type.

Computing devices, such as those mentioned above, may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices that are known, including, without limitation, a computer workstation, a desktop, notebook, laptop, handheld computer, or some other computing device.

Computing devices generally include instructions executable by one or more computing devices such as those listed above. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications in combination with physical components used to generate the waves or emissions. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

Figure 2:
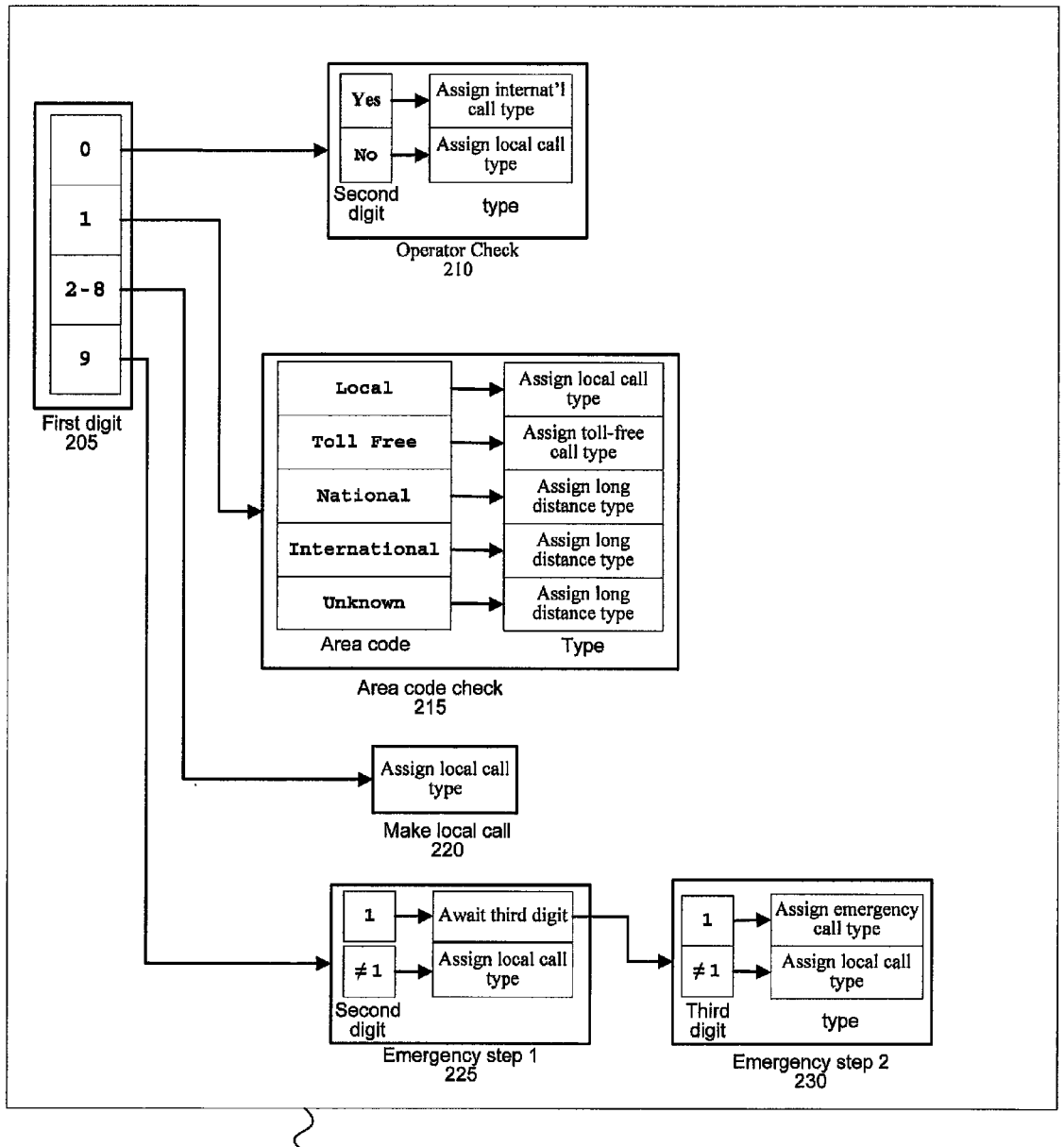
FIG. 2 illustrates an exemplary logic flow for communications routing.

FIG. 2 illustrates an exemplary logic diagram that router 115 may use to determine a call type corresponding to the communications request as successive digits are received. Upon receipt of a first digit, illustrated at 205, router 115 may assign the request to one of four exemplary groups. If the first digit is between two and eight, inclusive, the router 115 may determine that the communications request is a local call, and assign it the local call type.

If the first digit is a zero, router 115 may pause for a second digit, as detailed at 210. Router 115 may then delay assignment of a call type until it is determined whether there will be successive digits. Determination of successive digits may include, for example, receipt of another digit, a timer running out, or receipt of some other indicator as may be known. If it is determined that there is not a successive digit, router 115 determines that the call is an operator call and may assign an appropriate call type, such as an operator call type or a local call type. Alternatively, if there are additional digits succeeding the zero, router 115 may determine that the communications request is an international long distance call and may assign an appropriate call type, such as an international call type, or a long distance call type.

If the first digit is a nine, router 115 may await the second digit, as illustrated at 225. If the second digit is not a one, router 115 may determine that the communications request is a local call and may assign it the local call type. On the other hand, if the second digit is a one, router 115 may await a third digit, as illustrated at 230. In that case, if the third digit is a one, router 115 may determine that the communications request is an emergency call and may assign the appropriate call type, such as the emergency call type or the local call type. If the third digit is not a one, router 115 may again determine the request is a local call and assign it the local call type.

If the first digit is a one, router 115 may simply determine that the communications request is a long distance call any may assign a long distance call type. Alternatively, router 115 may await one or more additional digits, as illustrated at 215. In an exemplary approach, router 115 may await three additional digits, which may indicate an area code. Upon receiving an area code, router 115 may access a data store, such as area code database 300 (FIG. 3), and may search for the received area code within the database 300. In the exemplary approach, area code database 300 includes a local area code table 310 and a toll free area code table 320. In addition, area code database 300 may include additional area code tables, such as a national area code table and an international area code table, which may include, for example, all area codes accessible without dialing an international exchange. Router 115 may access area code database 300 and search for the received user input. In the exemplary approach, if a user 105 in the greater Detroit area dials a number including a local area code, such as those listed in local area code table 310, router 115 may assign the communications request a local call type. If a user 105 dials a toll-free area code, such as those listed in toll free area code table 320, router 115 may assign the communications request an appropriate call type, such as a local call type or a toll free call type. Router 115 may be further configured such that if the received area code is not found in area code database 300, the router 115 may assign the communications request a default call type, such as a long distance call type.

Figure 4:
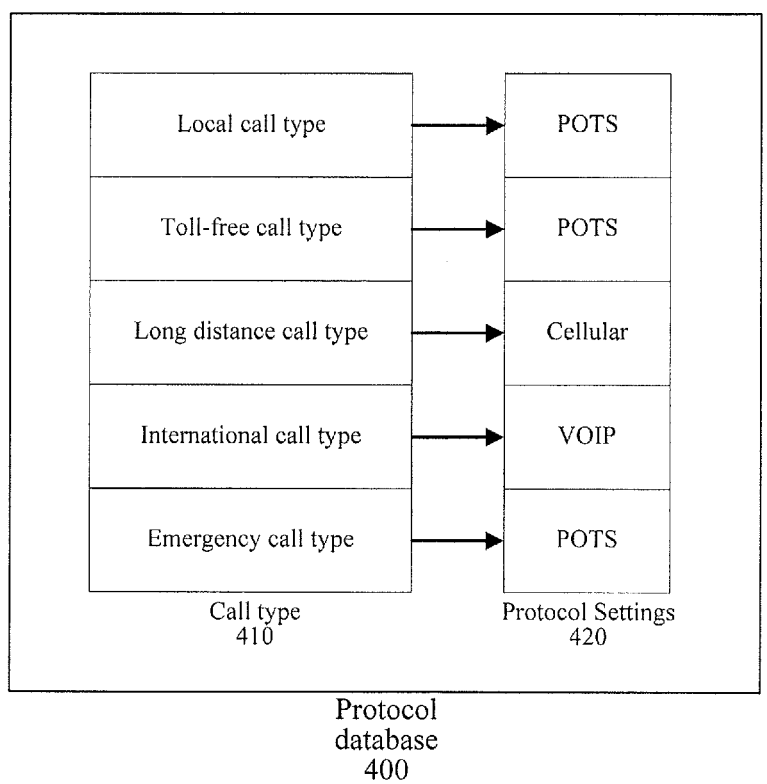
FIG. 4 illustrates an exemplary data store.

Once router 115 has assigned a call type to the communications request, router 115 may determine a communications protocol to assign to the communications request from a plurality of available protocols. In the exemplary approach, available protocols include POTS, cellular and VOIP, though other approaches may include other or additional protocols, such as satellite. Router 115 may determine the protocol to assign to a call type by, for instance, referencing a data store such as protocol database 400 (FIG. 4). Database 400 may include a call type data set 410 and a corresponding protocol setting data set 420. Accordingly, router 115 may reference an assigned call type, such as a local call type, to determine the preferred protocol setting, which may be POTS.

Protocol database 400 may be stored, for example, on a standalone router 115, on telephone 110, or another location accessible by router 115. Settings within protocol database 400 may be input by a user 105. Alternatively, settings within protocol database 400 may be transmitted from a remote location over a network, such as over communications network 145. Protocol settings 420 may be chosen based on one or more considerations. For example, protocol settings 420 may be chosen based on cost considerations, such as to provide the least expensive service to a user, or the most cost effective service for a service provider. Alternatively, protocol settings 420 may be chosen based on network considerations, such as to provide the most efficient network service, based on network reliability or robustness, to lessen loads on a particular network infrastructure, etc. In the illustrated approach, protocol settings are chosen based on a combination of cost considerations and network considerations. For example, the long distance call type may be assigned to cellular or to VOIP to minimize system cost. The emergency call type may be assigned to POTS due to considerations such as system robustness and user safety. Other call types, including local calls, toll-free calls and operator calls, are generally included in service fees for POTS, cellular and VOIP services. Thus, system cost considerations are generally irrelevant to a user, though system cost may be a factor for a service provider, for example, based on the cost of operating a particular protocol. As illustrated, local calls and toll-free calls are also associated with POTS, which may be based on network considerations, such as to maximize network efficiency. For instance, the exemplary approach may be used to lessen bandwidth requirements on cellular and VOIP systems, by transferring local and toll free call traffic to the POTS system. The POTS system has generally been capable of handling local call traffic without issue. The inclusion of toll free calls and emergency calls on a POTS system generally does not add significant demand, as the number of toll free and emergency calls is minimal in comparison to traditional local and long distance calls.

Protocol database 400 may be a generally static database, which is set once, and updated only occasionally. Alternatively, protocol database 400 may be dynamic and updated regularly. For instance, protocol settings may be altered based on the time of day at which a call is placed. For example, protocol settings may take into account cellular protocols, which may alter call rates based on the time of day through "night and weekend" rates. Alternatively, protocol settings table 420 may be updated regularly based on network status, such as the amount of traffic on a particular network or protocol, signal strength of a particular network, whether a particular protocol is down, during a power outage, or due to other variables.

Figure 5:
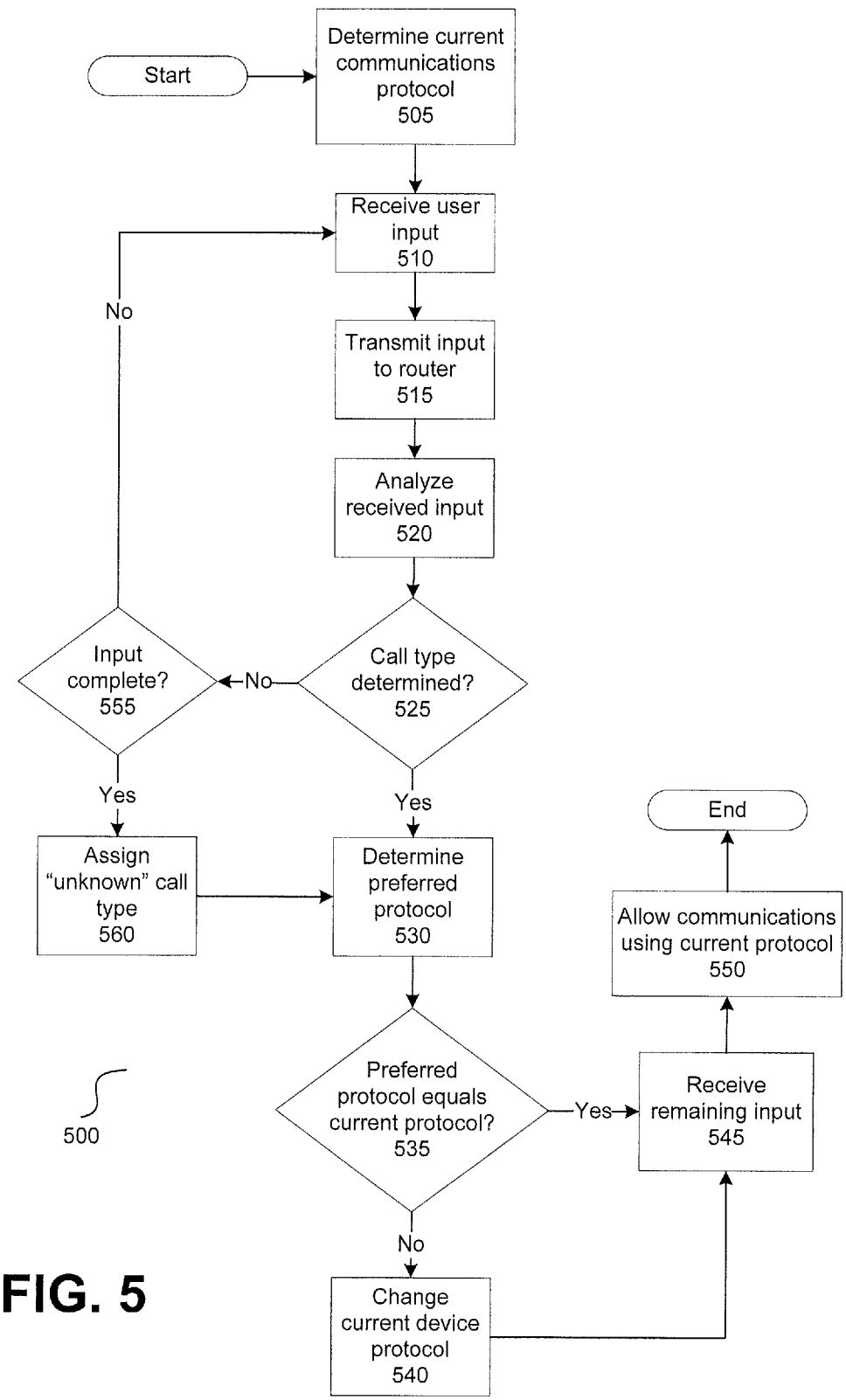
FIG. 5 illustrates an exemplary process flow for communications routing.

FIG. 5 illustrates an exemplary flow 500 for a communications system such as system 100. At step 505 a router such as router 115 may determine the current communications protocol for a communications device, such as telephone 110. The current communications protocol may be, for example, a default communications protocol, a most recently used protocol, a most commonly used protocol, etc.

Next, at step 510, telephone 110 receives an input from a user such as user 105. The input may be, for instance, a digit which may be entered by depressing a button on telephone 110.

At step 515, the received input is transmitted by telephone 110 to router 115. Transmitting the received input may include transmitting data over a connection, such as over a wired or a wireless connection, from a telephone 110 to a router 115. Alternatively, transmitting the received input may include passing data from one software module within telephone 110 to another software module within the telephone 110.

At step 520, router 115 analyzes the received input in an attempt to determine a call type. Router 115 may analyze the received input by, for instance, following a logic flow such as flow 200, and accessing a data store such as area code database 300.

At step 525, if router 115 has determined a call type in step 520, step 530 will be executed next. If router 115 has not been able to determine the call type in step 520, step 555 is performed next.

At step 555, router 115 determines whether the user input is complete. Router 115 may determine whether the user input is complete by, for instance, awaiting the expiration of a time interval or by receiving a subsequent user input. If the input is incomplete, step 510 may again be executed next. If the input is complete, step 560 may be executed next. At step 560, router 115 may assign a call type to the communications request. The call type may be an "unknown" call type, or may be another call type, such as the long distance call type. Step 530 may be executed next.

At step 530, after router 115 has determined the call type in step 520, router 115 may determine the preferred protocol. Router 115 may determine a preferred protocol by, for instance, referencing a database, such as protocol database 400. Protocol database 400 may include a call type data set 410 listing one or more call types, and a protocol settings data set 420 listing associated protocol settings for the call types.

At step 535, router 115 may determine whether the current protocol of telephone 110 is the same at the preferred communications protocol determined in step 530. If the current protocol is not the same as the preferred protocol, step 540 is executed next. If the current protocol is the same as the preferred protocol, step 545 is executed next.

At step 540, router 115 may indicate the preferred protocol to the telephone 110. If the preferred protocol differs from the current protocol, the current protocol may be changed in advance of communicating.

At step 545, after the call type has been determined and the protocol has been set, telephone 110 receives any remaining user inputs. Thus, a preferred protocol may be determined by router 115 and set prior to receiving all of the user inputs.

At step 550, after the user 105 has completed entry of the digits, telephone 110 begins communications using the chosen protocol.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
    a communications device configured to selectively allow communications in a plurality of communications protocols over a communications network; and
    a router configured to
        receive, from over the communications network based on a change in at least one of time of day and network status, updated protocol settings indicative of a mapping of call types to the plurality of communications protocols for the current time of day and network status,
        receive a communications request from a user of the communications device, the communications request including a destination telephone number,
        determine a call type based on the destination telephone number, and
        determine, according to the received protocol settings, a preferred communications protocol from the plurality of communications protocols based at least in part on the call type.

2. The system of claim 1, wherein the router is a software program residing on the communications device.

3. The system of claim 1, wherein the plurality of communications protocols includes at least Voice Over Internet Protocol (VOIP) and Plain Old Telephone Service (POTS).

4. The system of claim 1, wherein the router is configured to determine the call type by comparing one or more leading digits of the destination telephone number to data in a data store.

5. The system of claim 4, wherein the data store includes a database of local area codes.

6. The system of claim 4, wherein the data store is populated over a network.

7. The system of claim 1, wherein the router is configured to update a protocol database according to the received protocol settings, and determine the preferred communications protocol by referencing the determined call type in the protocol database.

8. The system of claim 1, wherein the call type is one of a local call, a long distance call, a toll-free call, an international call, an operator call and an emergency call.

9. The system of claim 1, wherein the router is configured to determine the preferred communications protocol based on minimizing a system cost.

10. The system of claim 1, wherein the router is configured to determine the preferred communications protocol based on maximizing network efficiency.

11. The system of claim 1, wherein the router is further configured to determine the preferred communications protocol accounting for the time of day.

12. The system of claim 1, wherein the router is further configured to determine the preferred communications protocol based on an amount of traffic over at least one of the plurality of communications protocols.

13. A method, comprising:
receiving, by a communications device configured to selectively allow communications in a plurality of communications protocols, from over a communications network based on a change in at least one of time of day and network status, updated protocol settings indicative of a mapping of call types to the plurality of communications protocols for the current time of day and network status;
receiving a communications request from a user, the communications request including a destination telephone number;
determining a call type based on the destination telephone number; and
determining, according to the received protocol settings, a preferred communications protocol from a plurality of available communications protocols based at least in part on the call type.

14. The method of claim 13, wherein the plurality of communications protocols includes at least Voice Over Internet Protocol (VOIP) and Plain Old Telephone Service (POTS).

15. The method of claim 13, further comprising accessing a data store to retrieve the preferred communications protocol associated with the determined call type.

16. The method of claim 13, wherein determining the call type includes comparing one or more digits of the destination telephone number to data in a data store.

17. The method of claim 16, wherein the call type is one of a local call, a long distance call, a toll-free call, an international call, an operator call and an emergency call.

18. The method of claim 17, wherein the data store includes preferred communications protocols for at least one of local calls, long distance calls, toll free calls and emergency calls.

19. The method of claim 13, wherein determining the call type includes comparing a received area code of the destination telephone number to a database including at least one of local area codes, long distance area codes and toll free area codes.

20. The method of claim 13, further comprising determining the preferred communications protocol based on minimizing a system cost.

21. The method of claim 13, further comprising determining the preferred communications protocol based on maximizing network efficiency.

22. A communications device configured to selectively make telephone calls over at least POTS and VOIP communications protocols, the communications device configured to:
receive, from over a communications network based on a change in at least one of time of day and network status, updated protocol settings indicative of a mapping of call types to the plurality of communications protocols for the current time of day and network status,
receive a telephone number from a user, to determine a preferred communications protocol based on at least a first received digit of the phone number,
determine a call type based on the received phone number,
determine, according to the received protocol settings, a preferred communications protocol from a plurality of available communications protocols based at least in part on the call type, and
initiate a call using the preferred communications protocol.

\* \* \* \* \*